(12) United States Patent
Bealkowski et al.

(10) Patent No.: US 6,601,109 B1
(45) Date of Patent: Jul. 29, 2003

(54) USB-BASED NETWORKING AND I/O HUB

(75) Inventors: Richard Bealkowski, Redmond, WA (US); Patrick M. Bland, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/283,360

(22) Filed: Mar. 31, 1999

(51) Int. Cl.[7] .............................................. G06F 13/00
(52) U.S. Cl. ..................... 709/250; 709/238; 709/245; 710/105; 710/129
(58) Field of Search ................................ 709/217, 218, 709/220, 230, 236, 237, 238, 245, 246, 250, 321; 710/63, 64, 65, 72, 105, 129

(56) References Cited

U.S. PATENT DOCUMENTS 6,122,676 A * 9/2000 Brief et al. ..................... 710/9
6,389,029 B1 * 5/2002 McAlear ..................... 370/402

FOREIGN PATENT DOCUMENTS

| JP | 10-187303 | 7/1998 | ............. G06F/3/00 |
| JP | 10-303948 | 11/1998 | ........... H04L/12/40 |
| JP | 10-340199 | 12/1998 | |
| JP | 2000-261447 | 9/2000 | |

* cited by examiner

Primary Examiner—Viet D. Vu
(74) Attorney, Agent, or Firm—Bracewell & Patterson LLP

(57) ABSTRACT

A system and method for providing network communications between personal computer systems using USB communications. The disclosed USB networking hub allows multiple hosts to exist in a USB-based network. The networking hub includes an integrated virtual network adapter, which provides for communications among and between multiple hosts.

9 Claims, 5 Drawing Sheets

USB-BASED NETWORKING AND I/O HUB

BACKGROUND OF THE INVENTION

1. Field of the Invention

The present invention generally relates to computer system networks, and more particularly to networked personal computer systems. Still more particularly, this application relates to the use of Universal Serial Bus based communications for computer networking.

2. Description of the Prior Art

Computer networking is, and has been for some years, common in, the industry. The ability to connect many computer systems in a network, whether as server/client or peer-to-peer, has become an indispensable tool to business, and has recently begun to enter users' homes. To make computer networking available to as many people as possible, it is desirable to make these networks as easy to set up and operate as possible.

Current networking equipment generally consists of a network interface card (NIC), which is installed in each computer system, then connected to other computer systems. Even the installation of the NIC is beyond the abilities of most computer users, since it generally entails actually opening the computer system chassis and physically installing the NIC on the system board.

Each NIC must then be connected either to a network hub, which allows many systems to be networked in a "hub and spoke" arrangement, or directly to one or more other systems in a daisy-chain arrangement. Each system must then be configured to communicate with each other system, using appropriate operating-system drivers. Other equipment, such as a printer, may then be attached to the network, and shared between the computer systems on that network.

Because of the relative complexity of setting up a computer network, it is beyond the ability of most individuals or small businesses, unless they are willing and able to take on the cost of hiring a technician to do the installation. It would therefore be desirable to achieve a means of networking computer systems and equipment that is as easy as possible.

The Universal Serial Bus (USB) specification describes a cable bus that supports data exchange between a host computer and a wide range of simultaneously accessible peripherals. The bus allows peripherals to be attached, configured, used, and detached while the host and other peripherals are in operation; i.e., the peripherals are "hot swappable." Because most personal computer systems now include an installed USB port, users are able to simply plug in any number of peripherals to the host computer system, allowing a wide range of devices to be easily attached and detached.

The host computer system is the system where the-USB Host Controller is installed. This includes the host hardware platform (CPU, bus, etc.) and the operating system in use; this is generally the only actual computer system present, with all other attached USB devices being either USB hubs or peripheral devices for that computer system. It is important to note that the USB specification, available at http://www.usb.org and hereby incorporated by reference, requires that only one host be present in any USB system.

A USB system has three primary types of devices, the USB host, described above; one or more USB devices, such as printers, scanners, and modems; and the USB interconnect, which is the manner in which USB devices are connected to and communicate with the host. The interconnect includes the Bus Topology, the Inter-layer Relationships, Data Flow Models, and the USB Schedule. The details of the interconnect, and device and host requirements, may be found in the USB specification, and is not of concern to the average user.

Because of the ease of using USB connections and devices for the average user, it is a preferred means of implementing many communications between computer systems and devices. Since the USB specification requires that there is only one USB host in any system, however, USB has not been available for use in networking multiple computer systems. Therefore, it would be desirable to provide a means for combining the ease-of-use of a USB system into a computer networking system, to provide an improved computer networking system that is technically accessible to most users.

SUMMARY OF THE INVENTION

It is therefore one object of the present invention to provide an improved computer system network.

It is another object of the present invention to provide an improved system and method for personal computer networking.

It is yet another object of the present invention to provide an improved system and method for personal computer networking utilizing Universal Serial Bus based communications.

There is therefore provided a system and method for providing network communications between personal computer systems using USB communications. The disclosed USB networking hub allows multiple hosts to exist in a USB-based network. The networking hub includes an integrated virtual network adapter, which provides for communications among and between multiple hosts.

The above as well as additional objectives, features and advantages of the present invention will become apparent in the following detailed written description.

BRIEF DESCRIPTION OF THE DRAWINGS

The novel features believed characteristic of the invention are set forth in the appended claims. The invention itself, however as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

The following description details the operation and features of several preferred embodiments of the present invention, but it will be understood by those of skill in the art that the scope of the invention is defined only by the issued claims, and not by any description herein.

Figure 1:
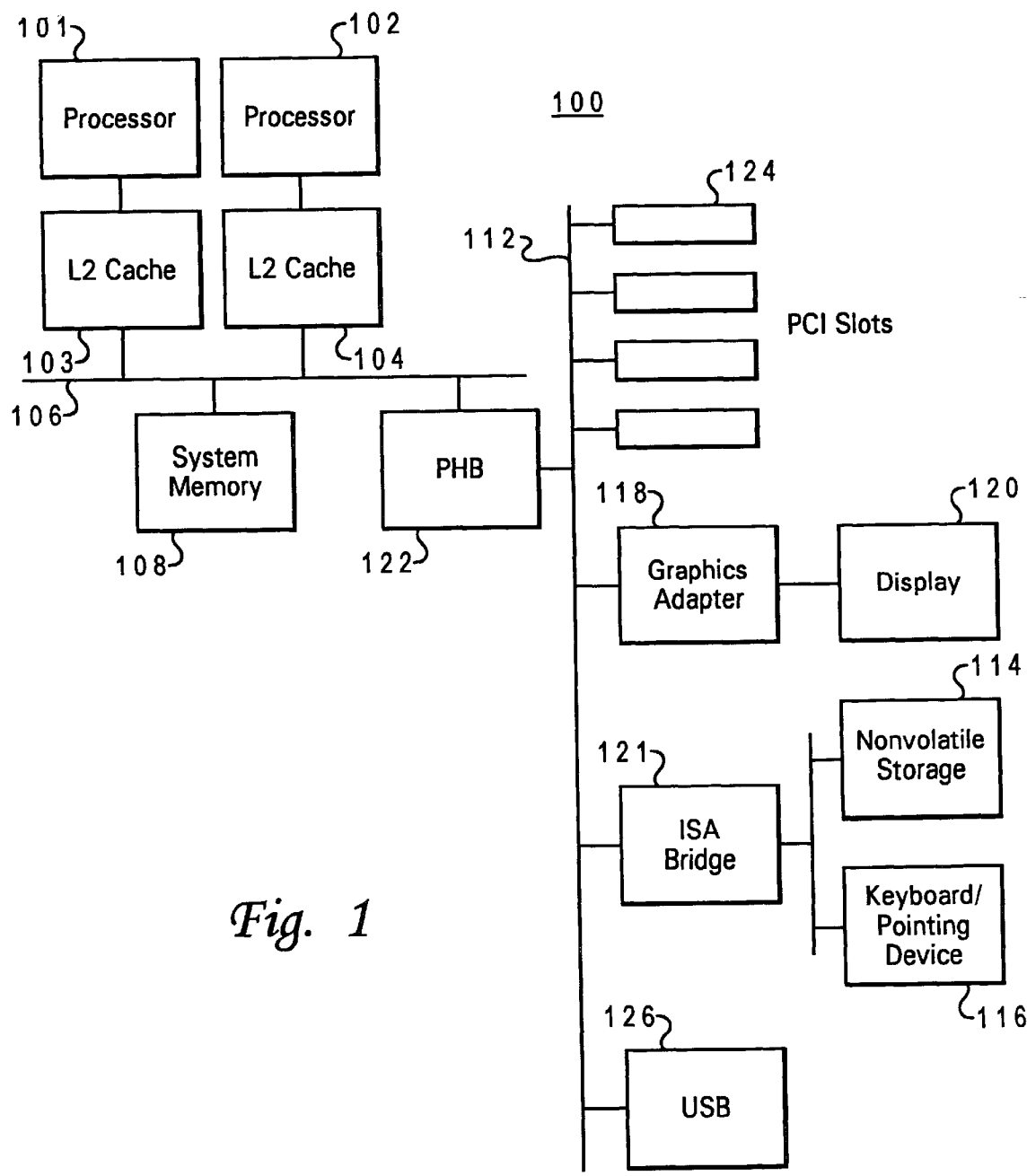
FIG. 1 is a block diagram of a data processing system in accordance with the preferred embodiment of the present invention.

With reference now to the figures, and in particular with reference to FIG. 1, a block diagram of a data processing system in which a preferred embodiment of the present invention maybe implemented is depicted. Data processing system 100 may be, for example, one of the desktop models of personal computers available from International Business Machines Corporation of Armonk, N.Y. Data processing system 100 includes processors 101 and 102, which in the exemplary embodiment are each connected to level two (L2) caches 103 and 104, respectively, which are connected in turn to a system bus 106.

Also connected to system bus 106 is system memory 108 and Primary Host Bridge (PHB) 122. PHB 122 couples I/O bus 112 to system bus 106, relaying and/or transforming data transactions from one,bus to the other. In the exemplary embodiment, data processing system 100 includes graphics adapter 118 connected to I/O bus 112, receiving user interface information for display 120. Peripheral devices such as nonvolatile storage 114, which may be a hard disk drive, and keyboard/pointing device 116, which may include a conventional mouse, a trackball, or the like, are connected via an Industry Standard Architecture (ISA) bridge 121 to I/O bus 112. PHB 122 is also connected to PCI slots 124 and USB controller 126 via I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention. Data processing system 100 and the exemplary networking hubs described below are provided solely as examples for the purposes of explanation and are not intended to imply architectural limitations.

Figure 2A:
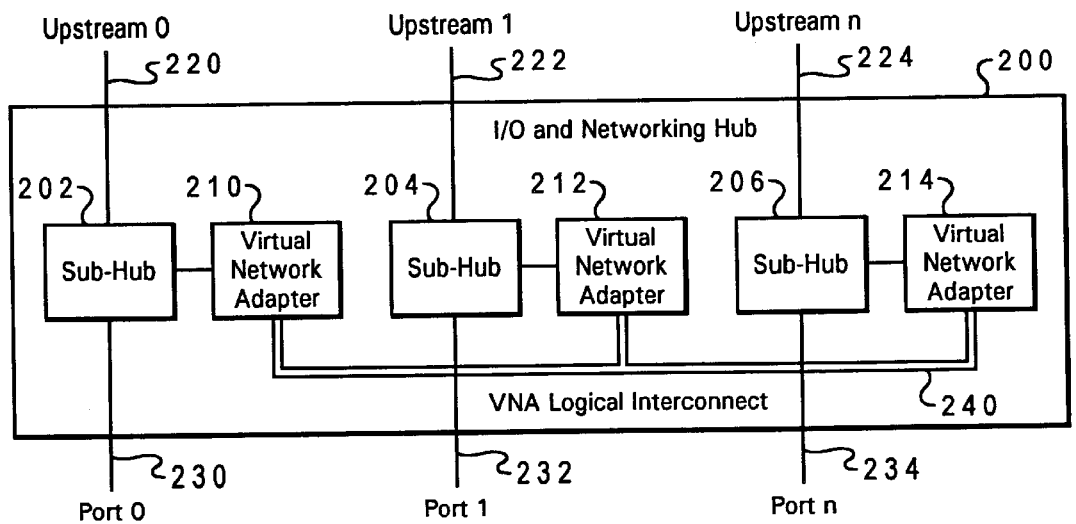
FIG. 2A depicts a block diagram of a networking hub in accordance with the preferred embodiment of the present invention.

Referring now to FIG. 2A, the networking hub 200 includes multiple sub-hubs, 202,204,206, each of which has an associated virtual network adapter (VNA) 210,212,214, respectively. Each sub-hub is connected to a single upstream host at host connections 220,222,224, and is connected to one or more USB devices on ports 230,232,234. It is noted that the USB specification refers to USB peripheral devices as "functions," and the terms "device" and "function" will be used interchangeably here. Each sub-hub allows communications, in a conventional manner, between its respective upstream host and devices attached to its ports. Although, in this exemplary diagram, only one port is shown attached to each sub-hub, those of skill in,the art will realize that each sub-hub can support multiple ports.

The respective VNAs 210,212,214 of each sub-hub are interconnected over logical interconnect 240 to provide for communications among and between each sub-hub. By communicating over the VNA system, communications are provided between the multiple hosts. Each sub-hub can accommodate a single upstream connection, a single VNA, and one or more downstream connections. It should be noted that upstream connections 220,222,224, need not be directly to a host, but may be connected, for example, over a series of interconnected USB hubs.

The VNA system is provided to overcome one limitation of the USB specification, which requires that only one host can connect to each USB system. The VNA 210,212,214 appears to each host, in the preferred embodiment, as an ethernet adapter attached to its respective sub-hub 202,204, 206. Each host therefore is able to communicate with each other sub-hub, and with the nodes and devices attached to the other sub-hubs, by communicating over the VNAs of the respective sub-hubs.

Figure 2B:
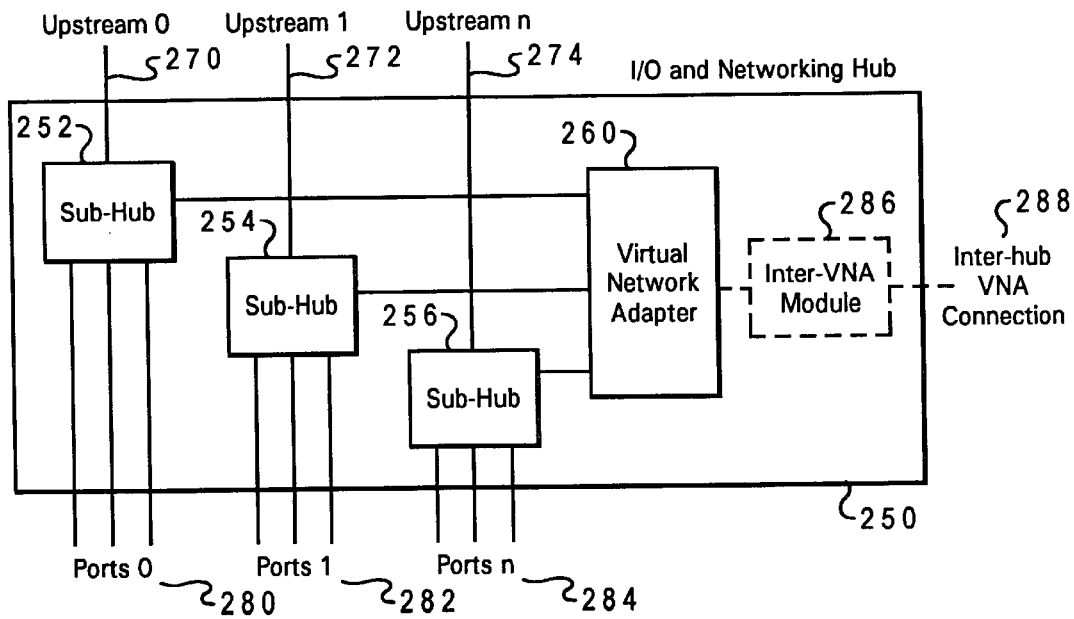
FIG. 2B depicts a block diagram of a networking hub in accordance with an alternate embodiment of the present invention.

With reference now to FIG. 2B, an alternate networking hub 250 is provided, in which a single VNA controller 260 manages communications between each sub-hub 252,254, 256. This embodiment, which appears to the hosts and USB devices to be functionally identical to the embodiment of FIG. 2A, reduces needless duplication of logic by combining the functions of multiple VNA controllers 210,212,214 into a single VNA controller 260. The single VNA appears to each sub-hub as its own dedicated network device.

This system operates as above, allowing hosts on upstream attachments 270,272,274 communicate via sub-hubs 252,254,256, respectively, to USB devices on ports 280,282,284. VNA 250 allows communications between the sub-hubs, so that each host can effectively communicate with other hosts. Inter-VNA module 286 and inter-hub VNA connection 288 allow multiple networking hubs to be interconnected.

Figure 3:
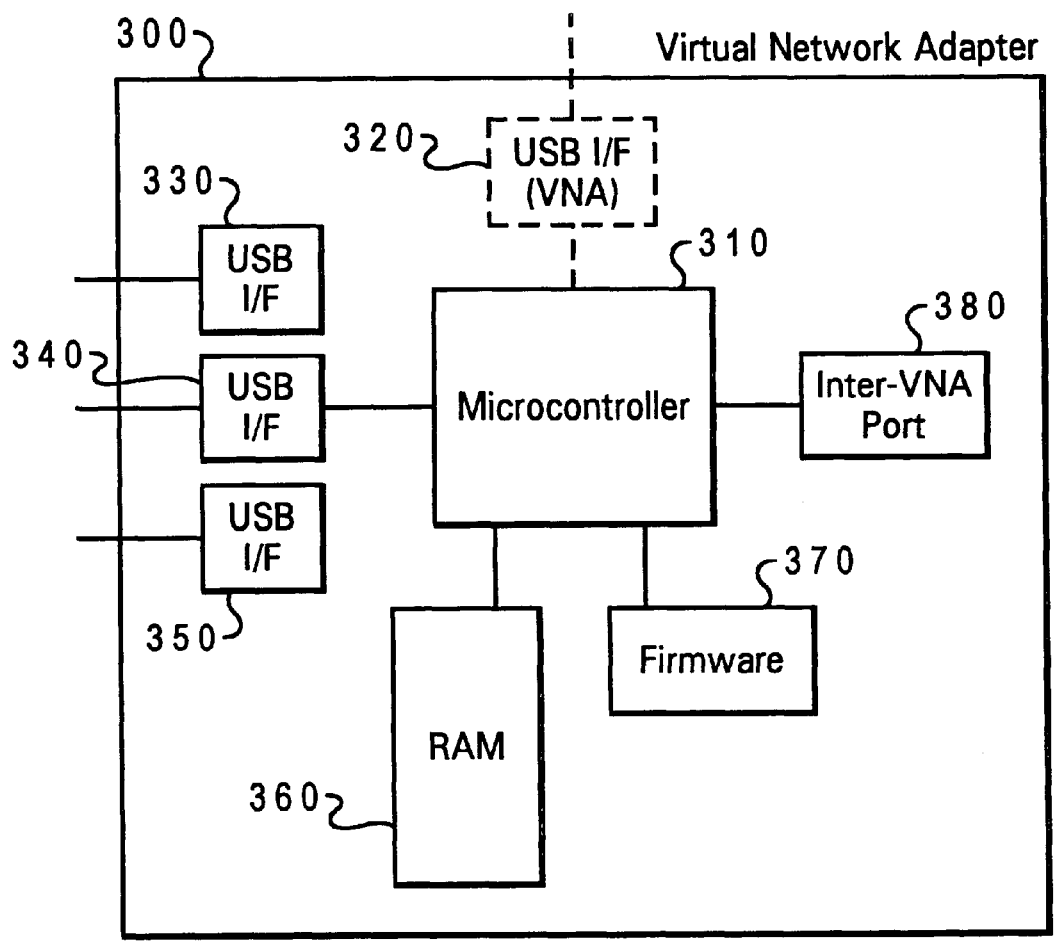
FIG. 3 is a more detailed block diagram of a virtual network adapter in accordance with a preferred embodiment of the present invention.

Referring now to FIG. 3, a more detailed block diagram of an exemplary VNA 300 is shown. VNA 300 is a single VNA with multiple sub-hub inputs, as shown in FIG. 2A. USB I/F blocks 330,340,350 are USB interface connections for the USB sub-hubs which the VNA interconnects. These are connected to microcontroller 310, which manages VNA communications. The VNA firmware 370 is preferably stored in a non-volatile FLASH memory. Random access memory 360 is used asa buffer and scratchpad memory.

The inter-VNA port 380 is an optional port used to connect directly to another VNA. In the preferred embodiment, communications over this port are standard serial communications, and a standard null-modem cable can be used to connect multiple VNAs. Of course, if a higher bandwidth is desired, this port can be implemented with any number of high-speed interconnects.

The USB I/F (VNA) block 320 is an optional dedicated USB port for the VNA to act as a USB "function" or device. This may be used for a USB host to communicate directly with the VNA, for example to update the VNA firmware.

Figure 4:
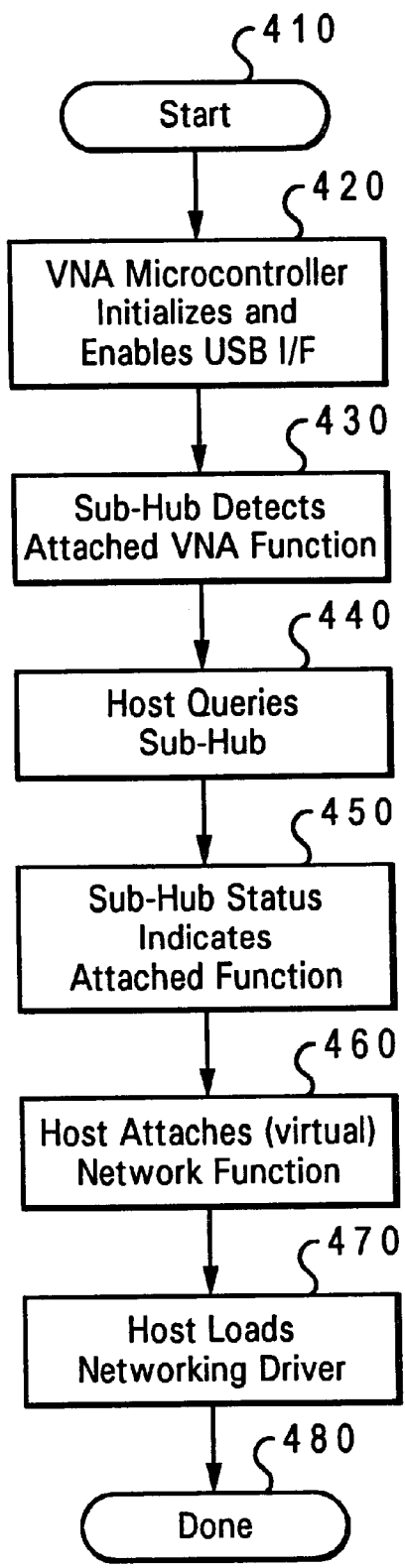
FIG. 4 depicts a flowchart of the initialization process of the virtual network adapter in accordance with a preferred embodiment of the present invention.

In reference to FIG. 4, a flowchart detailing the initialization sequence of the network hub is shown. Upon startup (step 410), the VNA microcontroller initializes and enables the USB interfaces to be recognized and attached by any attached sub-hubs (step 420). The connected sub-hubs then recognize the VNA and attach it as a USB function (step 430). After this, when the host queries the sub-hub over its USB upstream connection (step 440), the sub-hub indicates the VNA as an attached USB function (step 450). The host then attaches the VNA as a USB/Network function (step 460), since it sees the VNA as a network adapter attached to the USB sub-hub. The host then loads an appropriate network driver for the VNA (step 470), and the initialization routine ends (step 480).

Figure 5:
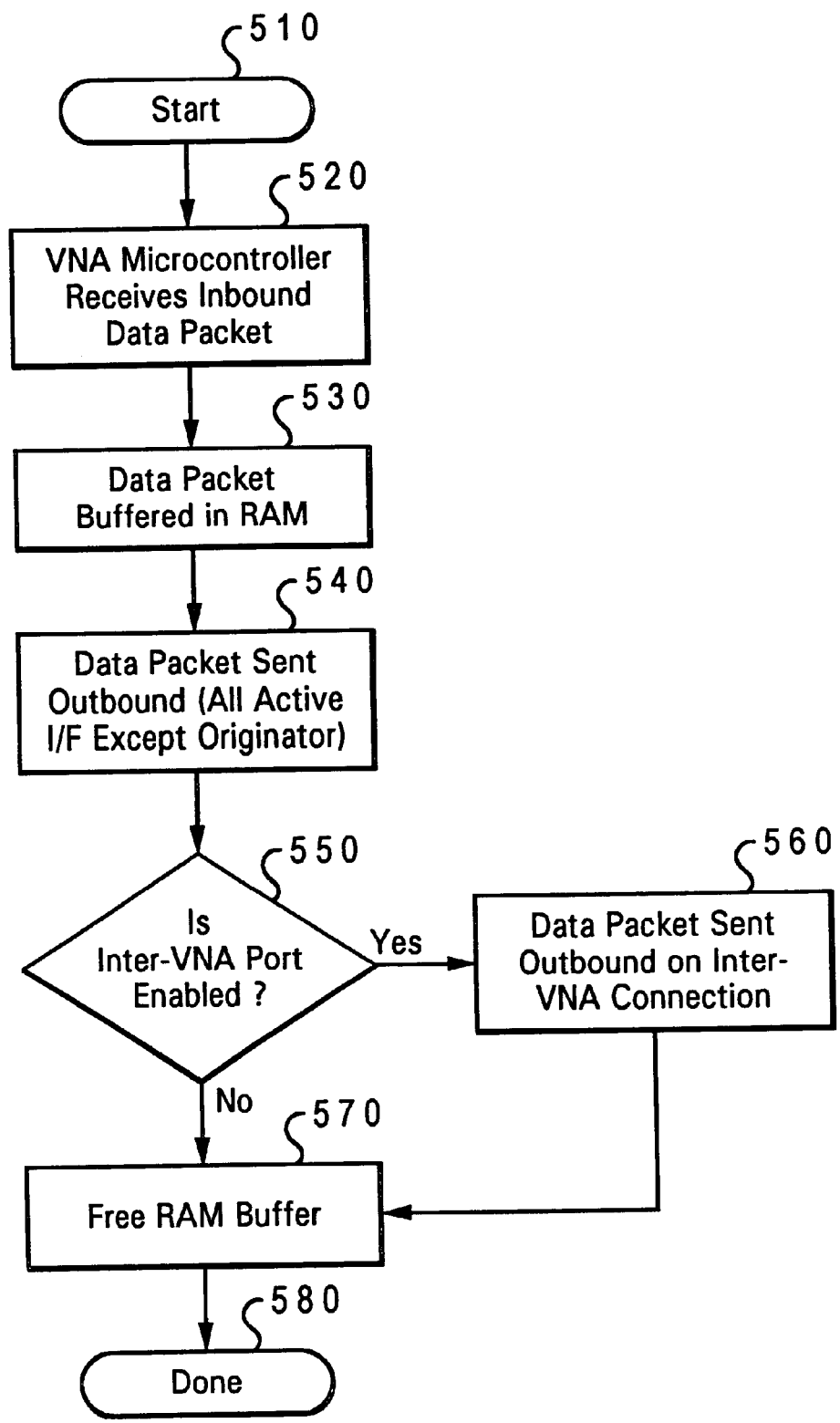
FIG. 5 is a flowchart of a data transmission routine in accordance with a preferred embodiment of the present invention.

With reference now to FIG. 5, a flowchart showing the VNA data transport routine is shown. When the system is operating (step 510), the VNA microcontroller will receive a data packet from a host via the sub-hub over one of its USB interfaces (step 520). This data packet is buffered in the VNA RAM (step 530), then sent out to the destination sub-hub (step 540). It should be noted that when the data packet is resent out, the VNA controller will rebroadcast this packet only to the non-originating USB interfaces; this prevents the originating sub-hub from receiving the resent packet broadcast. Next, if the inter-VNA port is enabled (step 550), the data packet is also sent out over the inter-VNA connection (step 560). Finally, when all broadcasts have completed, the VNA RAM,buffer is cleared (step 570) and the routine ends (step 580).

While the invention has been particularly shown and described with reference to a preferred embodiment, it will be understood by those skilled in the art that various changes in form and detail may be made therein without departing from the spirit and scope of the invention. For example, while the above description discusses is specifically drawn to the Universal Serial Bus specification, the disclosed networking system and virtual network adapter can be modified to any number of communications standards and different computer architectures and systems. Other variations are certainly within the ability of one skilled in the art, and are expected to fall within the scope of the claims.

What is claimed is:

1. A computer system network comprising:
    a plurality of network computer systems each having a Uniform Serial Bus (USB) communications port,; and
    a USB device hub including:
        a plurality of USB sub-hubs, each said sub-hub communicating with a respective network computer system and a virtual network adapter via USB protocol, said virtual network adapter providing a non-USB protocol communication among said plurality of USB sub-hubs, thus allowing said plurality of network computer systems to co-host said computer network,
    wherein each said network computer system is a co-host of said network and each said network computer system is a part of said USB device hub.

2. The network of claim 1, wherein said USB device hub comprises a microprocessor system which emulates a dedicated network adapter for each of said network computer systems.

3. The network of claim 1, wherein said network computer systems communicate with each other over said USB device hub.

4. The network of claim 1, wherein said sub-hubs each include at least one USB port for at least one peripheral device.

5. A Uniform Serial Bus (USB) communications hub, comprising:
    a plurality of USB sub-hubs; and
    a plurality of virtual network adapters, each of said USB sub-hubs communicating with a respective network computer system and one of said virtual network adapters via USB protocol, said virtual network adapters providing a non-USB protocol communication among said plurality of USB sub-hubs, thus allowing a plurality of said network computer systems to co-host a computer network, wherein each said network computer system is a co-host of said network and each said network computer system is a part of said USB communications hub.

6. The USB communications hub of claim 5, wherein said network computer systems communicate with each other over said USB communications hub.

7. The USB communications hub of claim 5, wherein each sub-hub includes at least one USB port for at least one peripheral device.

8. A Uniforms Serial Bus (USB) communications hub, comprising:
    a plurality of USB sub-hubs; and
    a single virtual network adapter, each of said USB sub-hubs communicating with a respective network computer system and said single virtual network adapter via USB protocol, said virtual network adapter providing a non-USB protocol communication among said plurality of USB sub-hubs, thus allowing a plurality of said network computer systems to co-host a computer network, wherein each said network computer system is a co-host of said network and each said network computer system is a part of said USB communications hub.

9. The hub of claim 8, wherein each sub-hub is configured with at least one USB port for at least one peripheral device.

\* \* \* \* \*